United States Patent [19]

Ming-Chin

[11] Patent Number: 4,807,369
[45] Date of Patent: Feb. 28, 1989

[54] DEVELOPMENT DRAFTER

[76] Inventor: Hu Ming-Chin, No. 1, Lane 109, Ta Kuang Road, Sec. 2, Pan Chiao City, Taipei Hsien, Taiwan

[21] Appl. No.: 107,974
[22] Filed: Oct. 13, 1987
[51] Int. Cl.⁴ .................................... G01B 5/20
[52] U.S. Cl. ....................... 33/175; 33/21.3; 33/562
[58] Field of Search ............... 33/175, 21.3, 669, 176, 33/347, 562, 563

[56] References Cited

U.S. PATENT DOCUMENTS

| | | | |
|---|---|---|---|
| 2,671,273 | 3/1954 | Barnes | 33/175 |
| 2,742,706 | 4/1956 | Rushing | 33/175 |
| 3,526,947 | 9/1970 | Pasek | 33/562 X |
| 4,208,802 | 6/1980 | Berndt | 33/347 |

Primary Examiner—William D. Martin, Jr.
Attorney, Agent, or Firm—Trexler, Bushnell, Giangiorgi & Blackstone, Ltd.

[57] ABSTRACT

A development drafter for use in the sheet metal works of ducts, pipings and tubes includes a long tape of flexible strip and a plurality of pins. The flexible strip is in continuity along the direction of the length provided thereon with equispaced and integrally formed a plurality of parallel tubular pin holder portions extending in the direction of the strip breadth. The pins are respectively frictionally inserted in the pin holder portions and have at each one end a head, and have the length longer than the breadth of the strip. By working with the drafter to gauge a working object a development elevation of the object can be quickly and effectively obtained.

6 Claims, 3 Drawing Sheets

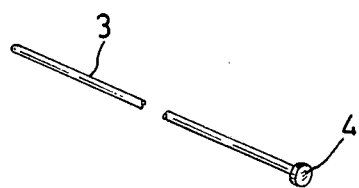
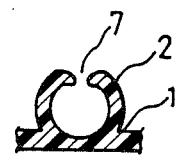
FIG. 3
FIG. 4
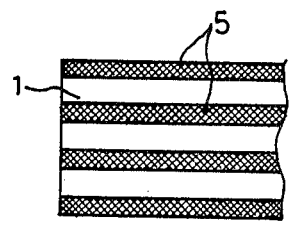
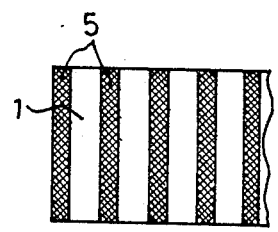
(A) (B)
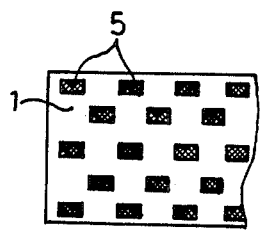
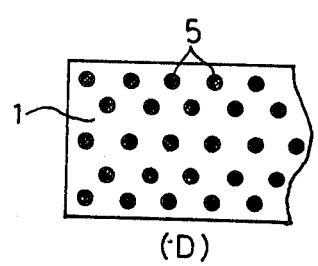
(C) (D)
FIG. 5
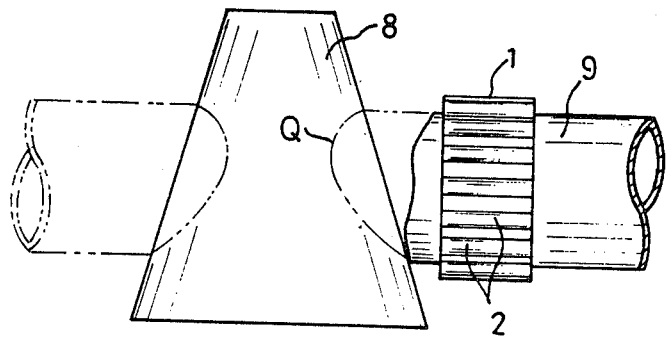
FIG. 6

DEVELOPMENT DRAFTER

BACKGROUND AND SUMMARY OF THE INVENTION

The present invention relates to a gauge developer, especially to a novel gauge developer for use in the sheet metal work of ducts, pipings, tubes etc. to enable a workman to obtain quickly a development elevation of an object by gauging the object on the job site.

Generally, in sheet metal work of delivery pipes, exhaust pipes and the like in a design and drawing office where when a development elevation of a complicated pattern is to be plotted, precise developed patterns can be obtained by use of the drawing instruments by a mechanical drawing or computer plotter technique. However, there is difficulty in acquiring a development elevation by gauging an object in the job-site work. This has usually to be carried out by taking dimensions of the various parts of the object with the help of such instruments as the compass, straight rule, tape rule, etc. and also the use of pencil, card board and scissors to fit the object in order to make a pattern by trial and error. The process is therefore tedious and time-consuming, and is less effective. Even to a most skillful workman, the plotting would take a longer time to accomplish and also because of the mistake in blanking as a result of error in the taking of dimensions and drawings, it would further result in the loss of materials.

Accordingly, an object of the present invention is to provide a novel gauge developer drafter adapted for use in gauging an object on the job site to obtain in an easy and fast way a development elevation so desired.

A further object of the invention is to provide a gauge developer adaptable to an object body of various sizes by cutting a section of strip of any length and variably inserting pins of different length.

An additional object of the invention is to provide a gauge developer which can be used by a workman in the first time and without the help of any other measuring instrument or drawing instrument to acquire in a shortest time a developed pattern and the development elevation so obtained to be very accurate.

In order to accomplish the foregoing objects, the gauge developer of the invention includes a long tape of a flexible strip having thereon in the direction of the strip length a plurality of equi-spaced parallel tubular pin holder portions extending in the direction of the strip breadth. Inserted in each of the pin holder portions is a pin having the length longer than the breadth of the strip. When it is desired to plot the development elevation of an object body, such as a duct, a pre-determined length of the strip is cut off from the long tape of the flexible strip and thereafter this length of strip is wound round the working object of the duct at the determined place on the latter and is temporarily attached thereto. The pins are next pushed one by one towards the end of the pipe for which development elevation is to be plotted till one end of each of the pins presses against the respective position on the duct body. A development elevation may thus be obtained when the strip is next removed from the Other objects and advantages of the present invention will become apparent from the following detailed description of the preferred embodiments thereof in connection with the accompanying drawings.

THE DRAWING

FIG. 3 is a perspective view of a modified form of the head of the pin shown in FIG. 1, some parts thereof being broken away;

FIG. 4 is an enlarged sectional view of another embodiment of the pin holder portion shown in FIG. 2;

Figure 1:
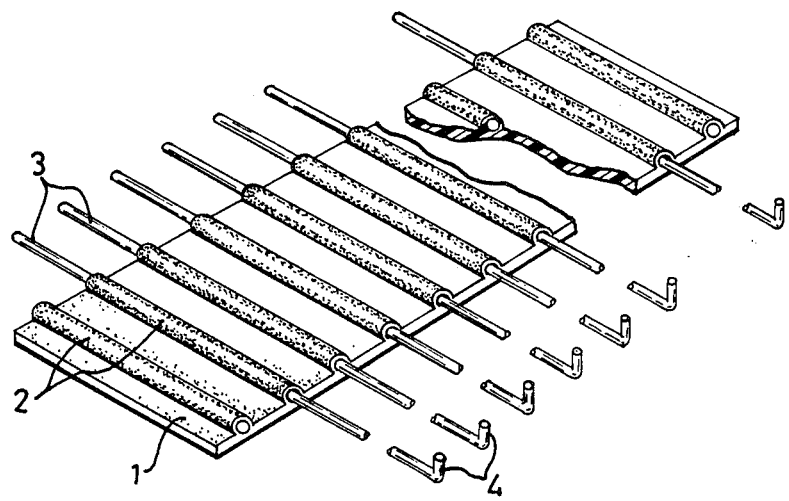
FIG. 1 is a perspective view of a first embodiment of a gauge developer of the present invention, some parts thereof being partially broken away.
Figure 7:
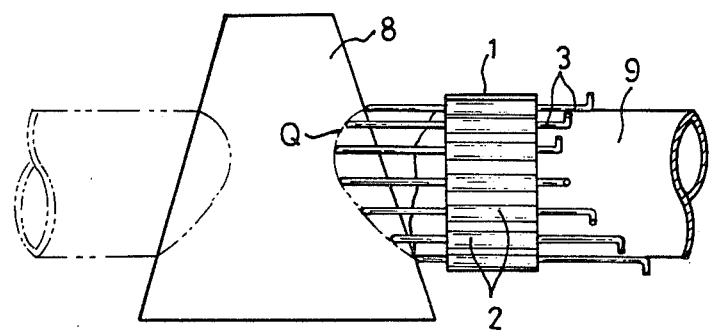
Figure 8:
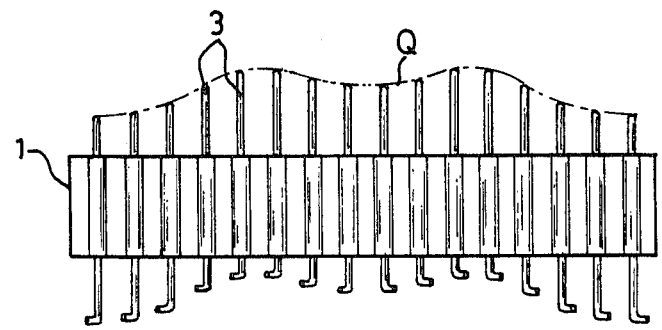

FIGS. 5(A) to 5(D) are plan views of the various embodiments of the adhesive layer on the back of the flexible strip shown in FIG. 1; and FIGS. 6 to 8 illustrate an example of use of the gauge developer of the present invention, in which FIG. 6 is an elevational view showing the condition where the strip is wound round a working object, FIG. 7 is an elevational view showing the condition where the pin holder portions of the flexible strip are provided by insertion therein with the pins and FIG. 8 is a plan view showing the condition where the flexible strip has been spread out to form a development elevation.

DETAILED DESCRIPTION OF PREFERRED EMBODIMENTS OF THE INVENTION

As shown in FIG. 1, the gauge developer of the invention comprises a long flexible strip 1 fabricated from the elastomer of rubber and synthetic resin. On one side along the direction of the strip length, this flexible strip 1 is formed in continuity in an equi-spaced and parallel way with a plurality of tubular pin holder portions 2 extending in the direction of the breadth of the strip and projecting upwardly. The pin holder portions 2 are passed by insertion therein each with a long pin 3 provided at one end thereof with a curved head 4 and having a length longer than the breadth of the flexible strip 1, that is, longer than the length of the pin holder portion 2. The pins 3 are retained in the position by elastic force and friction force occurred between the outer circumference of the inserted portion thereof and the inner circumference of the pin holder portion. However, if forces greater than the friction force are exerted, these pins can be pushed forward or backward, or they can be withdrawn from the respective pin holder portion 2.

Figure 2:
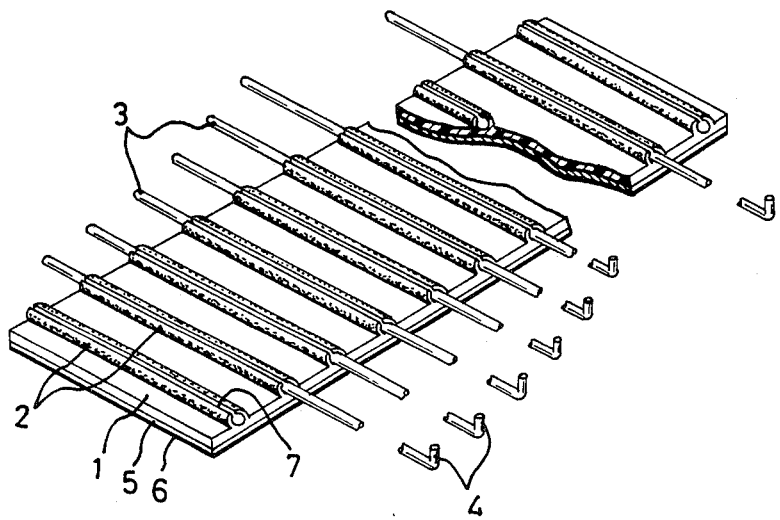
FIG. 2 is a perspective view of a second embodiment of the gauge developer, some parts thereof being partially broken away.

Illustrated in FIG. 2 is the second embodiment of the gauge developer of the invention, which differs from the aforesaid embodiment in a few aspects, otherwise the two embodiments are identical in constitution. While in the first embodiment the pin holder portions 2 are formed each of a circular tubular shape having one end, that is, the base end, integrally formed with one side of the strip 1, in the present embodiment said pin holder portions 2 are formed each of an open tubular shape having the other end, that is, the upper end, formed with an elongated slit cut along its axial direction, whereby it makes the withdrawal or pushing of the pins 3 more easier. Also in the second embodiment, the flexible strip 1 is formed on its other side with an adhesive layer 5 for temporary attachment of the strip. On the surface of this adhesive layer 5 is attached a release paper 6.

In both of the above described embodiments, the head 4 of the pin 3 is formed by bending one end into the form of a right angle. However, it will be appreciated that one end of the pin 3 is formed by a header into the head 4 having a greater diameter, as shown in FIG. 3, or into any other shape. In principle, the shape must be such that when the pin 3 is inserted into the pin holder portion 2, the head 4 is able to lock at one end of the pin holder portion 2 and prevent fall-off, and when in use, it also enables the fingers to hold on, push or withdraw the pin 3.

It will be further appreciated that the opening of the slit 7 is so configured that the pin 3 may be easily pressed into the pin holder portion 2 or taken out therefrom.

Again, it is appreciable that the adhesive layer 5 for use in temporary attachment may be formed either by the adhesive being applied directly on to the back side of the flexible strip 1 or a two-side adhesive tape being stuck to the said back side. In addition to the one obtained by the entire back side of the strip 1 coated with the adhesive or stuck with the two-side adhesive tape as shown in FIG. 2, the adhesive layer 5 may also be arranged in such a manner that there is formed on a portion of the back side of the strip 1 a plurality of continuous bands extending in a lengthwise or breadthwise direction or of interrupted bands or even spots or of random shaped arrangement, as shown in FIGS. 5(A) through 5(D).

It is to be noted that depending on the size of a working object the strip 1 of the gauge developer constructed in accordance with the principle of the invention may be fabricated into a long tape of strip body having different breadths and rolled in a roll of strip. The pin holder portions 2 may then be densely formed and, to conform to the breadth, there may be prepared pins 3 of different lengths to facilitate its uses on various spots.

Hereinafter, an example to illustrate the use of the gauge developer in obtaining a development elevation of the joiner part of the working object of a conical tube and a cylinder is described in conjunction with FIGS. 6 to 8.

In the example, the working objects are the conical pipe 8 and the cylinder 9 and the development elevation to be acquired is the joiner end of the cylinder 9 in relation to the conical pipe 8. First, a desired length of the flexible strip 1 is cut from the tape and on to the back of the strip 1 is applied in a random way the adhesive if the tape of the type as shown in FIG. 1 is used, or the released paper 6 of the adhesive layer 5 on the back of the strip 1 is peeled off. The strip 1 is then rolled over the front end of the cylinder 9 and temporarily stuck on the cylinder 9 by the adhesive layer 5. The pins 3 of appropriate length are next inserted in the pin holder portions 2 and with hand holding the respective head 4 the pins 3 are pushed forward until the front ends thereof press against the cone-shaped pipe 8 at the curve Q of the imaginary seam destined to form the joiner part of the cylinder 9. In this way, when all the pins 3 have been inserted and properly positioned in the pin holder portions 2, the strip 1 is taken down and spread out flat on a board or paper and by connecting all the end points of the pins 3 with a writing implement a developed pattern equivalent to the curve Q shown in FIG. 8 can thus be obtained.

Following the use of the gauge developer of the invention, the foregoing steps describe one example of the developed pattern obtainable by first sticking the strip 1 temporarily in place on the working object and then inserting the pins 3 in the pin holder portions 2 thereof. However if instead, the strip 1 of the type shown in FIGS. 1 or 2 where the pins 3 have been previously inserted in the pin holder portions 2 is used, to obtain the desired development elevation all that is needed to do is to just attach the strip temporarily on the working object and then to adjust the pins 3.

In the foregoing embodiment, for use in the adhesive layer 5 a two-side adhesive tape or any other suitable temporary attachment means may be employed in place of the adhesive. Again, in use if a rough developed pattern is just what is required and requires no high precision, insertion of pins 3 in the alternate pin holder portions 2 will be sufficient. Furthermore, since the elastic and frictional forces of the strip are able to maintain the pins 3 in position, these pins once inserted in the pin holder portions will not loose out.

Owing to aforesaid construction in the development drafter of the invention, it enables a desired developed pattern to be acquired by merely temporarily attaching the strip on to the working object and pushing the pins till one ends thereof press against the determined locations on the working object, and by taking down and spreading out the strip. Therefore, it will be appreciated that when under such conditions where there is no drawing, a developed pattern required for sheet metal making or maintenance on the job site may be easily and effectively obtained following the present invention. Even for those who are not skilled in the drawing techniques may also be able to obtain the complicated developed pattern in a simple way by using the apparatus of the present invention, whereby the efficacy of the on-site work is greatly raised and also any mistakes in the blanking previously caused by the errors in the drawings can be minimized. Hence, the gauge developer of the invention is of highly practical value.

I claim:

1. A gauge developer comprising:
   a long tape of elastomeric flexible strip being in continuity along the direction of the length thereof and having provided thereon, equally spaced, and integrally formed, a plurality of parallel pin holder portions extending in the direction of the strip breadth and further having an adhesive layer provided on a back portion thereof for temporarily attaching said strip to a surface, a plurality of pins respectively frictionally inserted in said pin holder portions and including at one end thereof a head said pins having a length greater than the breadth of said strip, and wherein said pin holder portions are of open-tubular shape, having base ends integrally formed on an upper side of said flexible strip and free ends defining an elongated axial slit.

2. The gauge developer according to claim 1, wherein said adhesive layer is in the form of a coating spread substantially all over the back of said flexible strip.

3. The gauge developer according to claim 1, wherein said adhesive layer is in the form of a noncontinuous pattern or random arrangement.

4. The gauge developer according to claim 1, wherein said adhesive layer includes two-sided adhesive tape.

5. The gauge developer according to claim 1, wherein said pin holder portions are of an approximately cylindrical, closed-tubular shape having base ends integrally formed on the upper side of said flexible strip.

6. The gauge developer according to claim 1, wherein said axial slits are formed each with the opening wider at the outside, with respect to said strip, and narrower at the inside, thereby facilitating the guiding of said pins into insertion with said pin holder portions.

* * * * *